(12) United States Patent
Bertiller et al.

(10) Patent No.: US 7,178,329 B2
(45) Date of Patent: Feb. 20, 2007

(54) FEED DEVICE FOR SUPPLYING SOLID UREA GRANULES INTO AN AMMONIA GENERATOR ARRANGED WITHIN OR OUTSIDE OF AN EXHAUST LINE

(75) Inventors: Roland Bertiller, Dorfsstrasse 54, D-72459 Albstadt (DE); Marco Bertiller, Dorfsstrasse 54, D-72459 Albstadt (DE); Eberhard Jacob, Krailing (DE)

(73) Assignees: MAN Nutzfahrzeuge AG (DE); Roland Bertiller (DE); Marco Bertiller (DE)

( * ) Notice: Subject to any disclaimer, the term of this patent is extended or adjusted under 35 U.S.C. 154(b) by 41 days.

(21) Appl. No.: 11/155,333

(22) Filed: Jun. 16, 2005

(65) Prior Publication Data

US 2005/0284135 A1   Dec. 29, 2005

(30) Foreign Application Priority Data

Jun. 17, 2004   (DE) .................. 10 2004 029 387

(51) Int. Cl.
    F01N 3/00   (2006.01)
(52) U.S. Cl. .................. 60/286; 60/295; 60/301
(58) Field of Classification Search .......... 60/286, 60/295, 301
    See application file for complete search history.

(56) References Cited

U.S. PATENT DOCUMENTS 5,584,265 A * 12/1996 Rao et al. ............... 123/1 A
5,809,775 A * 9/1998 Tarabulski et al. ........... 60/274
5,813,224 A * 9/1998 Rao et al. .................... 60/274
6,266,955 B1 * 7/2001 Liang et al. ................. 60/274
6,301,879 B1 * 10/2001 Weisweiler et al. .......... 60/274
6,399,034 B1 * 6/2002 Weisweiler ............. 423/213.2
6,502,390 B2 * 1/2003 Goerigk et al. .............. 60/286
6,928,807 B2 * 8/2005 Jacob et al. ................. 60/286

* cited by examiner

*Primary Examiner*—Thomas Denion
*Assistant Examiner*—Diem Tran
(74) *Attorney, Agent, or Firm*—Robert W Becker & Associates; Robert W Becker

(57) ABSTRACT

A feed device for supplying solid urea granules into an ammonia generator arranged within or outside of an exhaust line for production of ammonia makes possible $NO_x$ reduction with the catalytic purification of exhaust of an internal combustion engine, gas turbine, or a burner, whereby the solid urea granules are stored in a holding tank. No compressed air support for transporting and metering the urea granules is required and transporting and metering of the urea granules adapted to the ammonia specifications is possible. The feed device has a housing with an inlet for supplying the urea granules and internally, a motor-driven, rotating disk with at least one spiral-shaped acceleration channel, as well as an outlet leading outward, to which a tube leading to the ammonia generator is connected.

17 Claims, 3 Drawing Sheets

FEED DEVICE FOR SUPPLYING SOLID UREA GRANULES INTO AN AMMONIA GENERATOR ARRANGED WITHIN OR OUTSIDE OF AN EXHAUST LINE

BACKGROUND OF THE INVENTION

The invention relates to a feed device for supplying solid urea granules into an ammonia generator disposed within or outside of an exhaust line.

It is known to treat the exhaust of diesel engines by means of selective catalytic reduction (SCR) for the reduction of $NO_x$. As reduction means for this purification process, ammonia is used, which can be produced in various ways within or outside of the exhaust line. The starting material for this can be solid urea or a urea solution.

EP 0487886 discloses a method for converting a urea solution by hydrolysis into ammonia and carbon dioxide.

EP 0615777 B1, in contrast, discloses a method in which solid urea particles are converted into ammonia, which is then processed in the scope of exhaust post-treatment to nitrous oxide reduction. For supply of the solid urea particles, a holding tank for the particles and a specialized metering device are provided. In this connection, a motor-driven worm conveys the supplied urea particles into a line impinged with compressed air, in which they are carried away and supplied to a hydrolytic catalytic converter. One disadvantage of this solution is the poor meterability of the amount of the urea particles and the high consumption of compressed air.

With another similar solution disclosed in DE 10252734 A1, solid urea prills on the end of a conveyor, in which they are moved by means of a motorized worm to a crushing device, are crushed by rotating vanes or blades. These vanes or blades are also a part of a blower and produce an air flow in its housing, with which the crushed urea particles are conveyed via a tube into an exhaust line.

Although with this solution, no independent compressed air source is required, it is not completely satisfactory, because it permits only a relatively rough metering of the urea prills.

SUMMARY OF THE INVENTION

In contrast, it is an object of the present invention to produce a feed device for solid urea granules with which a compressed air-supported transporting of the urea granules can be eliminated and which makes possible dispensing of the urea granules that can be adapted to the ammonia requirements.

The core of the feed device of the present invention is a driven, rotating disk arranged in its housing, with at least one spiral-shaped acceleration channel, with which the individually conducted urea granules can be accelerated to an adjustably high speed and can be guided in such an accelerated manner to the ammonia generator.

Based on this mechanical acceleration of the urea granules, no independent compressed air source is required, unlike certain cases of the prior art. In addition, the feed device permits a very exact number- and volume-related dispensing of the urea granules, which makes possible in a regulating- and control-sense, an accurate adaptation of the required urea volume to the required ammonia volume for the exhaust purification.

The urea granulate preferably comprises spherical grains of the same size. Alternatively, also cylindrical urea pellets can be used. The urea granules can have a size or a diameter of a single tenth of a millimeter to multiple millimeters, preferably 1.5 to 3 mm, and can be pre-fabricated with a density of 1.33 g/ml for example.

Depending on the speed and the size of the urea granules, these can be broken down more or less intensely into individual parts in the ammonia generator with impingement on a grid or an impingement surface of an impingement body with different surface angles. Diesel urea debris particles in total have a substantially larger surface compared to the urea granules broken down in the ammonia generator and form a urea particle cloud with favorable distribution on the input of the hydrolytic catalytic converter, so that in the latter case, the conversion into ammonia is optimal and can run at reduced temperatures of approximately 150° to 200° C. The solid urea granules can be accelerated by means of the feed device of the present invention, such that they have a speed of preferably 30–100 m/s upon break-down in the ammonia generator. The rotational speed of the disk of the feed device for example can be 16,000 rotations per minute. The volume of the supplied urea granules grains depends on the $NO_x$ content of the exhaust flow to be purified. Thus, for example, 100 urea granules per second can be broken down in the ammonia generator. By means of the high supply frequency range of 20 to 100 Hertz, an optimal, simple adaptation of the volume flow to the respective dispensing job (for example a passenger car or commercial vehicle) with predetermined urea granules sizes is possible.

By the type of the curvature of the at least one acceleration channel, additionally by the rotational speed of the disk, the speed of the urea granules is affected. The at least one acceleration channel is defined on its acceleration side by a wall, which has a curvature formed from multiple circular radii and/or a logarithmic curve and/or a curve with a continuous positive inclination.

Preferably the at least one acceleration channel provided on the upper side of the disk begins in the area of the axis of rotation of the disk, leads to its circumferential edge and runs there at last approximately tangentially relative to this. Thus, the entire disk surface is used optimally and forms the longest possible acceleration channel with which the urea granules can be accelerated without jolting from approximately zero to a maximum speed. In the housing of the feed device, an annular channel that is coaxial to the axis of rotation is arranged on the rotating disk at the level of the at least one acceleration channel provided on this. The annular channel forms a partial section of the outlet channel and the urea granules can be guided into the annular channel via an inlet opening.

By means of the arrangement of the at least one acceleration channel tangentially on the edge, the urea granules can be conducted with maximum speed without energy loss from the disk into the groove surrounding it and from this, via a bore branching off tangentially and forming a further section of the outlet channel, into the tube connected thereon and via this tube, can broken down in the ammonia generator.

The feed device is preferably associated with a metering or dispensing device, with which the urea granules can be conducted in a metered manner from the holding tank into the housing of the feed device. The holding tank preferably is arranged above the housing and the rotating disk and has at least one inclined surface in its lower region leading to a bottom-side outlet opening. The latter ensures that the urea granules are conducted without additional conveyor means or features alone by gravity from the holding tank.

The metering device is arranged between the holding tank for the urea granules and the housing of the feed device. The inlet of the metering device is connected with the outlet opening of the holding tank and the outlet of the metering device is connected with the inlet of the feed device.

The bottom-side outlet opening in the holding tank can be adapted in view of its shape and size either to a single outlet of the urea granules or a simultaneous outlet of multiple urea granules. In the latter case, the outlet opening can be formed by an elongated outlet chute.

The inlet of the metering device, in turn, is adapted to the type and size of the outlet opening of the holding tank.

The metering device, for example, has a continuously rotating conveyor belt with a plurality of adjacent depressions, in which, respectively, a urea granule can be received. The conveyor belt of the metering device is guided via two spaced gears or via a gear in connection with a connecting member or guide device or via two spaced friction gears or pulleys, whereby at least one of the gears, friction gears or one of the pulleys is driven by a motor. Thus, the driving of the conveyor belt of the metering device preferably is independent from the driving of the disk of the feed device. In this manner, the rotating disk of the feed device can in a metered fashion add very precisely to the volume of the urea granules with the metering device. This metered addition is oriented to the degree of purification, in particular the nitrous oxide content of the exhaust and the related amount of ammonia for the related catalytic nitrous oxide reduction.

In detail, it is possible in the outlet of the metering device to provide a guide device, for example, with which the urea granules, beginning at the metering device, are guided in the direction of the inlet of the feed device and its rotating disk. The inlet of the feed device is connected to the outlet of the metering device after the guiding device, which is formed in the cover of its housing over the rotating disk adjacent to its axis of rotation.

Preferably, the feed device can be sealed off in a gas-tight manner by means of a check valve from gases, dirt, moisture, solid exhaust residue, etc., which can penetrate into it via the tube from the ammonia generator or the exhaust line.

DETAILED DESCRIPTION OF SPECIFIC EMBODIMENTS

Figure 1:
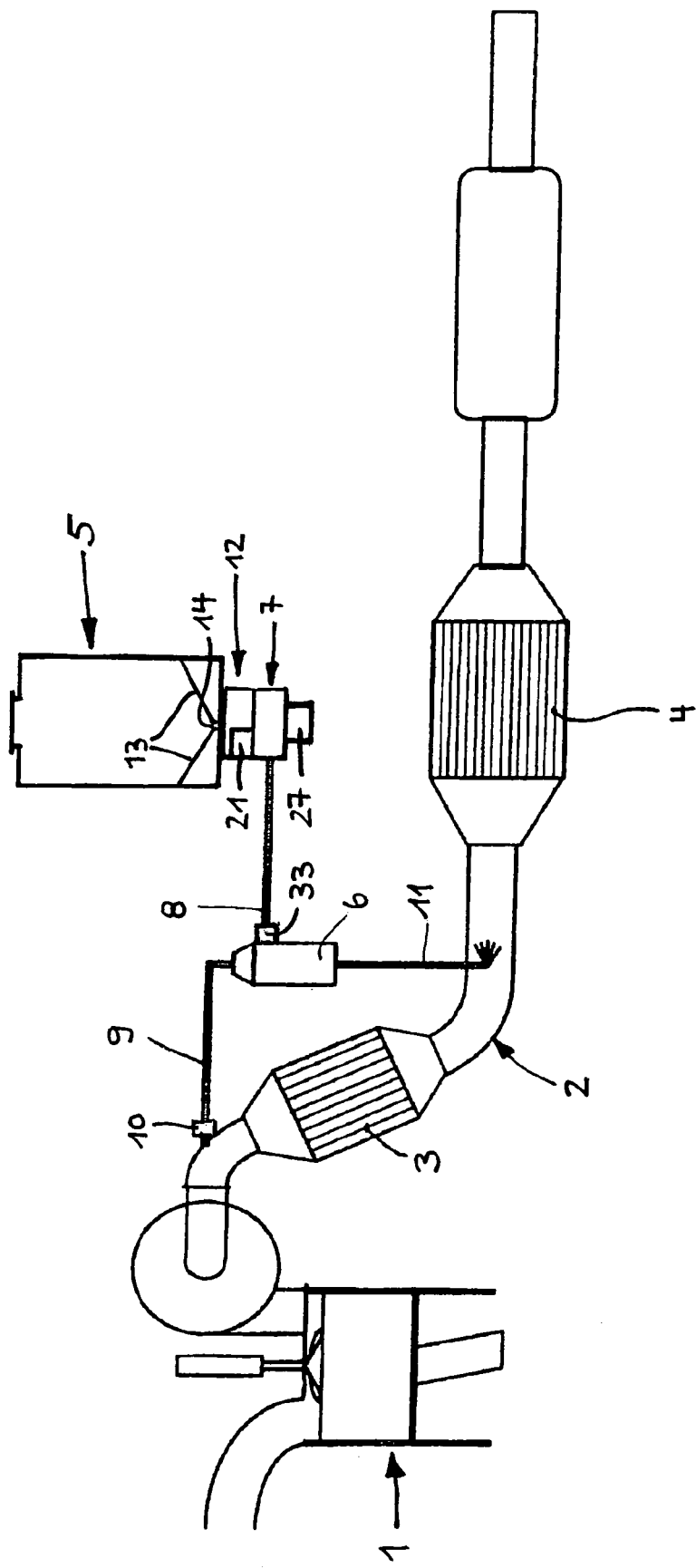
FIG. 1 shows schematically the exhaust section of a diesel engine with an exhaust post-treatment device and a type of association of the device of the present invention.

FIG. 1 shows a diesel engine 1, whose exhaust gases are guided away in a cleaned state to the atmosphere via an exhaust line or system 2 with integrated exhaust post-treatment devices, here a pre-oxidation catalytic converter 3 for $NO_2$-enrichment of the exhaust and an SCR catalytic converter 4 for selective catalytic reduction of $NO_x$. Instead of the diesel engine 1, the exhaust producer also can be a burner or a gas turbine. In order to perform the $NO_x$ reduction in the SCR catalytic converter, it is necessary to add the reduction means, ammonia, in the exhaust gas stream before introduction into the SCR catalytic converter 4. This is produced within or outside of the exhaust system 2, whereby as the starting basis, either a urea solution or solid urea can be used.

In the present case, only solid urea is of interest, which can be supplied in the form of pre-fabricated spherical or cylindrical granules in a refillable holding tank 5 and can be dispensed from this for the production of ammonia. For production of ammonia, an ammonia generator 6 is provided, which can be arranged outside of (as shown in FIG. 1) or within the exhaust system 2 and the urea granules are supplied by means of the feed device 7 of the present invention via a tube 8. With the thermal conversion of urea, ammonia and isocyanic acid are generated. The latter is likewise converted subsequently within the ammonia generator 6 in connection with water vapor by catalytic hydrolysis, likewise into $NH_3$ and $CO_2$. As a water vapor source, for example an exhaust branch current is used as shown in FIG. 1, which can be fed via a bypass line 9 from the exhaust system 2 through a regulating device 10, regulated in its volume, into the ammonia generator 6. The gas mixture containing ammonia provided after the conversion process at the outlet of the ammonia generator 6 is fed in a flow before the SCR catalytic converter 4 into the exhaust flow, in the example shown in FIG. 1 via a supply line 11.

Figure 2:
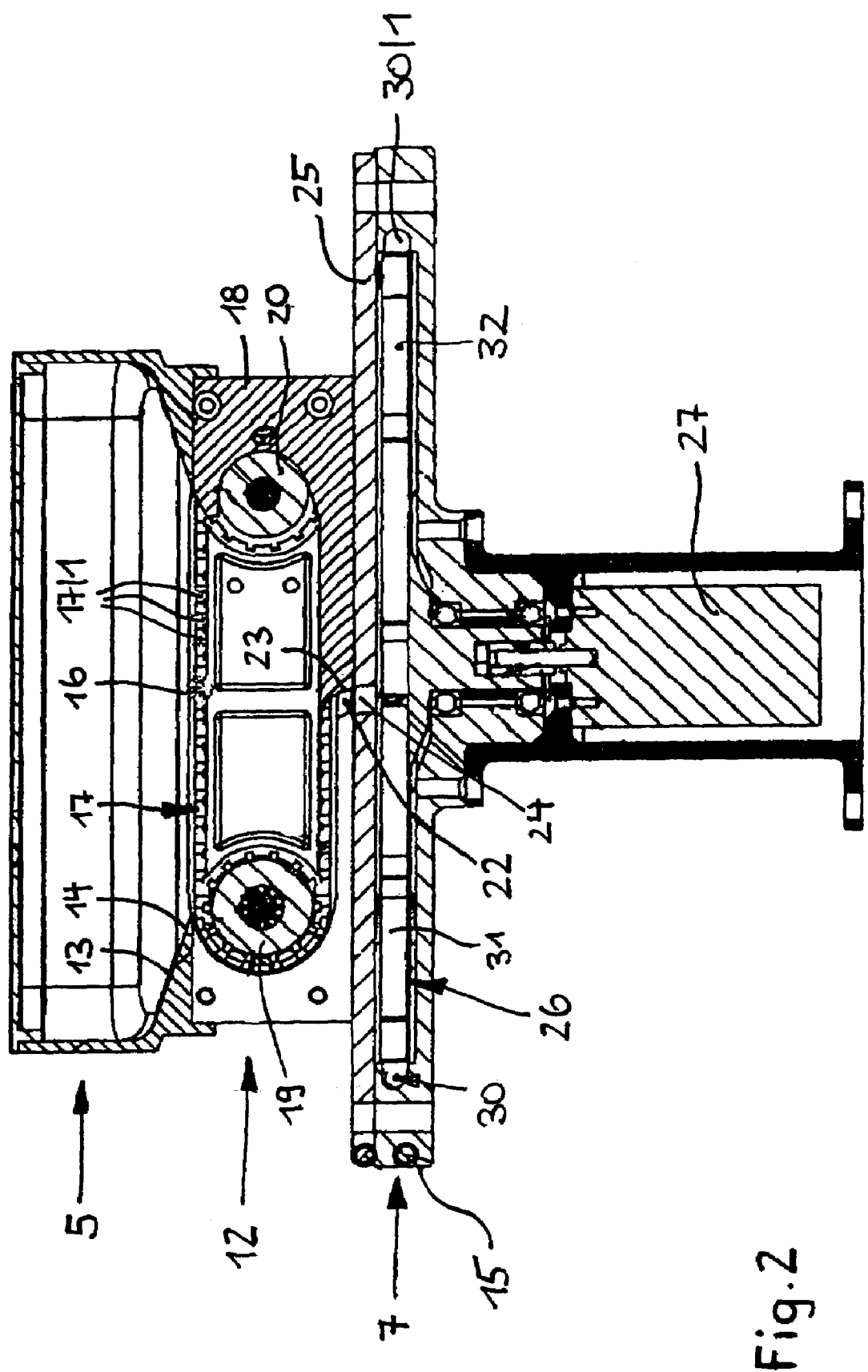
FIG. 2 shows in sectional view an embodiment of the feed device with an associated holding tank for the urea granules and associated metering device.

FIG. 2 shows an embodiment of the feed device 7 schematically shown in FIG. 1 in an exemplary association with the holding tank 5 for the urea granules and with a metering device 12.

The holding tank 5 has in its lower region inclined surfaces or a hopper 13, which leads to a bottom-side outlet opening 14. Its shape and size can either be designed for an individual outlet of a urea granule or to the simultaneous outlet of multiple urea granules and in the latter case, for example, can be formed by an elongated outlet chute.

In the example shown, the holding tank 5 is arranged above the feed device 7 and the metering device 12 is arranged between the holding tank 5 and the housing 15 of the feed device. The inlet 16 of the metering device 12 is connected with the outlet opening 14 of the holding tank 5 and is adapted to its type and size. Beneath the inlet 16 of the metering device 12, a continuously circulating conveyor belt 17 moves past, which has a plurality of adjacent depressions 17/1, in which, respectively, a urea granule can be received. The continuous conveyor belt 17 can be guided via two gears 19, 20 supported at a distance form one another or via a gear in connection with a connecting member or guide device or via two friction gears or pulleys. At least one of the gears 19, 20, friction gears, or pulleys is driven by a motor 21.

The urea granules, sliding over the slanted surfaces or the hopper 13 to the outlet opening 14 in the holding tank 5 fall via the outlet opening 14 and the inlet 16 of the metering device into the depressions 18 of the conveyor belt 17 and are transported by means of these depressions to an outlet 22. This outlet 22 of the metering device 12 preferably has a curved guide device 23, with which the urea granules are conducted without jarring from the metering device 12 and are supplied via a connected inlet channel 24 of the feed device 7 into this. The inlet channel 24 is formed in the cover 25 of the housing 15 of the feed device over a rotatably supported disk 26 disposed therein adjacent to its axis of rotation.

The disk 26 driven by a motor 27 has at least one spiral-shaped acceleration channel 28, 29 according to the present invention. In addition, the feed device 7 has an outwardly leading outlet channel 30, to which a tube 8 leading to the ammonia generator 6 is connected.

Figure 3:
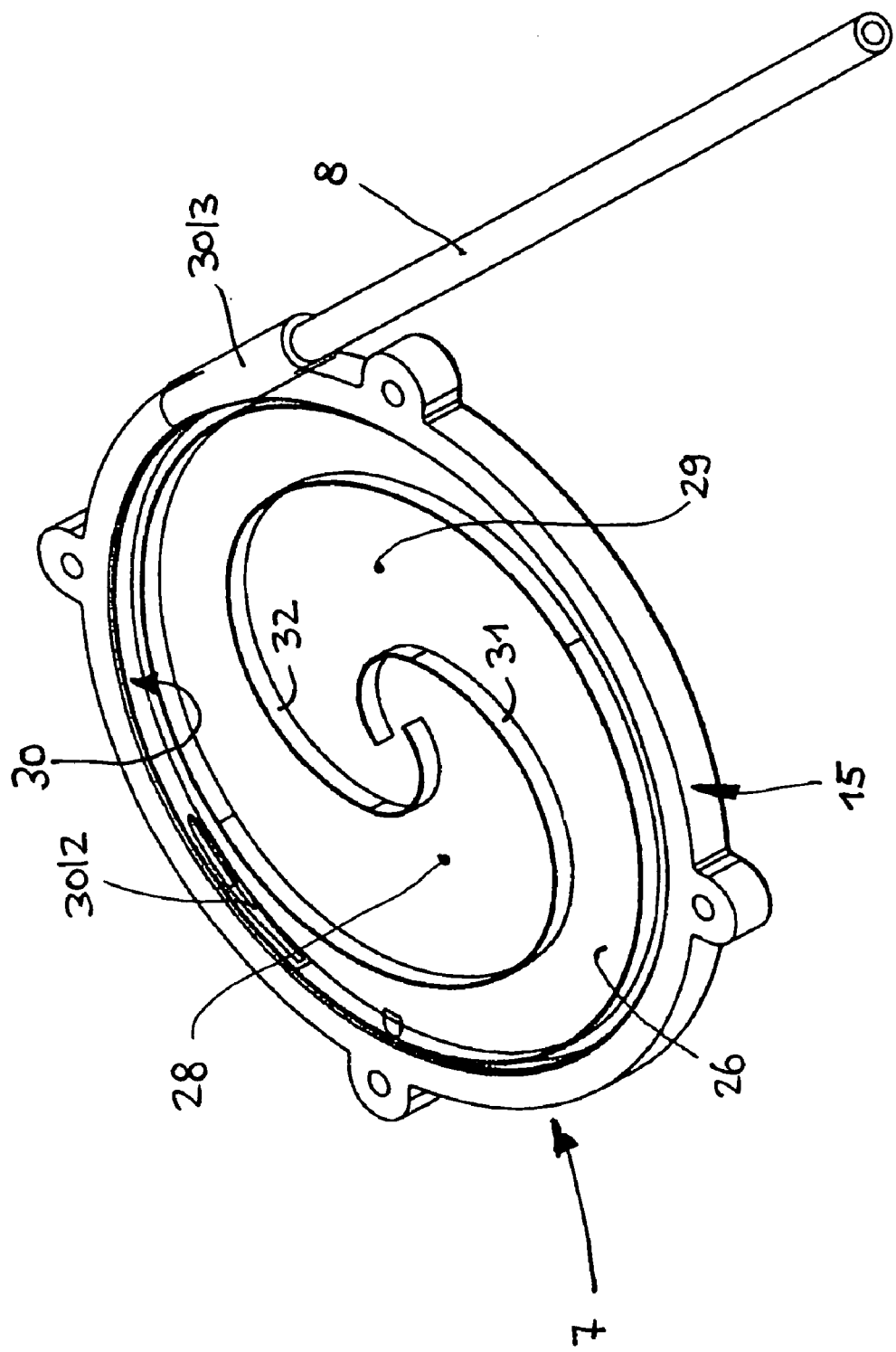
FIG. 3 shows a perspective view of an embodiment of the feed device of the present invention with an open housing on the rotating disk.

As can be seen in FIG. 3, the embodiment of the feed device 7 that is shown has a disk 26 with two acceleration channels 28, 29 arranged on its upper side. Each channel is defined on its acceleration side by a wall 31, 32, which has a curvature formed from multiple circular radii and/or a logarithmic curve and/or a curve with continuous positive inclination. In this manner, each of the acceleration channels 28, 29 begins in the area of the axis of rotation of the disk 26 and leads out to the circumferential edge of the disk 26 and runs there at least approximately tangentially relative to this. By means of the rotation of the disk 26 with the spiral-shaped acceleration channels 28, 29, each supplied urea granule accelerates from the center of the disk 26 to its edge to a very high maximum speed.

In the housing 15 of the feed device, an annular channel 30/1 that is coaxial to the rotational axis of the disk is arranged about the disk 26 at the level of its acceleration channels 28, 29, which forms a part of the outlet channel 30 and in which the accelerated urea granules can be conducted via an inlet opening 30/2. From this annular channel 30/1, a bore 30/3, likewise formed in the housing 15, branches off tangentially as a further section of the outlet channel 30, to which a tube 8 leading to the ammonia generator 6 is connected. By means of this tangential arrangement of the bore 30/3 and its straight continuation through the tube 8, the urea granules accelerated in this manner are transported from the annular channel 30/1 with maximum speed in the direction of the ammonia generator 6.

The motor 27, by which the disk 26 is driven, is driven separately and independently from the motor 21 that drives the conveyor belt 17 of the metering device.

By these separate drives of the conveyor belt 17 and the disk 26, the speed with which the urea granules are broken down in the ammonia generator 6 and the volume of the urea granules to be broken down can be adjusted and regulated independently of one another.

The tube 8 preferably is equipped with a check valve 33. In the blocking state, it prevents heat, solid exhaust components, moisture and the like from the ammonia generator 8 from penetrating into the tube 8 and from this into the feed device 7. In addition, the check valve 33 prevents the formation of condensation water in the tube 9 and the feed device 7.

The specification incorporates by reference the disclosure of German priority document 10 2004 029 387.2 filed 17 Jun. 2004.

The present invention is, of course, in no way restricted to the specific disclosure of the specification and drawings, but also encompasses any modifications within the scope of the appended claims.

The invention claimed is:

1. A feed device for supplying solid urea granules into an ammonia generator arranged within or outside of an exhaust line for production of ammonia for effecting $NO_x$ production with catalytic purification of exhaust of an engine or burner, comprising:
   a holding tank, wherein the urea granules are stored in the holding tank;
   a housing with an inlet for supplying the urea granules;
   a motor-driven rotating disk disposed within the housing with at least one spiral-shaped acceleration channel and an outwardly-leading outlet channel; and
   a tube connected to the outlet channel, wherein said tube leads to the ammonia generator.

2. The feed device of claim 1, wherein the at least one spiral-shaped acceleration channel is arranged on an upper side of the disk and is defined on an acceleration side by a wall, wherein the wall has a curvature formed from at least one of multiple circular radii, a logarithmic curve, and a curve with a continuous positive inclination.

3. The feed device of claim 1, wherein the holding tank has a hopper for the urea granules in a lower region or at least one inclined surface leading to an outlet opening on a bottom side of the hopper.

4. The feed device of claim 1, wherein the tube includes a check valve, wherein the check valve prevents penetration of heat, solid exhaust components, or moisture from the ammonia generator into the tube and from the tube to the feed device.

5. The feed device of claim 1, herein the at least one acceleration channel begins in the area of an axis of rotation of the disk, leads to a circumferential edge of the disk, and runs at least approximately tangential relative to the edge.

6. The feed device of claim 5, wherein an annular channel that is coaxial to the axis of rotation is arranged in the housing around the disk at a level of the at least one acceleration channel, wherein the annular channel forms a partial section of the outlet channel, and wherein accelerated urea granules are conducted via an outlet opening into the annular channel.

7. The feed device of claim 6, wherein a bore branches off tangentially from the annular channel arranged in the housing around the disk as a further section of the outlet channel, and wherein a tube leading to the ammonia generator is connected to the bore.

8. The feed device of claim 1, wherein the feed device is associated with a metering device, wherein the urea granules are conducted from the holding tank in metered amounts into the housing of the feed device with the metering device.

9. The feed device of claim 8, wherein the metering device is arranged between the holding tank and the housing of the feed device, wherein an inlet of the metering device is connected with the outlet opening of the holding tank, and wherein the outlet of the metering device is connected with the inlet of the feed device.

10. The feed device of claim 9, wherein the bottom-side outlet opening in the holding tank with regard to its shape and size is adapted to a release of a single urea granule.

11. The feed device of claim 9, wherein the bottom-side outlet opening in the holding tank with regard to its shape and size is adapted to a simultaneous release of multiple urea granules and is formed as a longitudinal outlet chute.

12. The feed device of claim 10, wherein the inlet of the metering device is adapted to the type and size of the outlet opening of the holding tank.

13. The feed device of claim 8, wherein the metering device has a continuously rotating conveyor belt running past the inlet with a plurality of depressions adjacent one another, wherein a respective urea granule is received in each of the depressions.

14. The feed device of claim 13, wherein the conveyor belt of the metering device is guided via two gears spaced apart from one another or via a gear in connection with a connecting member or via two friction gears or pulleys, and wherein at least one of the gears, friction gears or pulleys is driven by a motor.

15. The feed device of claim 14, wherein driving of the conveyor belt of the metering device is independent from driving of the disk of the feed device.

16. The feed device of claim 9, wherein the outlet of the metering device has a guide device, and wherein with the guide device, the urea granules are guided from the metering device in the direction of the inlet of the feed device and to the rotating disk.

17. The feed device of claim 16, wherein the inlet of the feed device connected to the outlet of the metering device after the guide device is formed in the cover of the housing over the rotating disk adjacent to the axis of rotation of the disk.

* * * * *